US012766814B2

(12) United States Patent
Benoit

(10) Patent No.: US 12,766,814 B2
(45) Date of Patent: Oct. 20, 2026

(54) STONE SURFACE COVERING

(71) Applicant: TRANSVERSALITY, Brussels (BE)

(72) Inventor: Prieur Benoit, Brussels (BE)

(73) Assignee: Transversality, Brussels (BE)

( * ) Notice: Subject to any disclaimer, the term of this patent is extended or adjusted under 35 U.S.C. 154(b) by 208 days.

(21) Appl. No.: 18/744,346

(22) Filed: Jun. 14, 2024

(65) Prior Publication Data

US 2024/0343018 A1 Oct. 17, 2024

Related U.S. Application Data

(63) Continuation-in-part of application No. 17/614,206, filed as application No. PCT/EP2020/064416 on May 25, 2020, now Pat. No. 12,017,445.

(30) Foreign Application Priority Data

May 29, 2019 (EP) .................................... 19177396
Jun. 3, 2019 (EP) .................................... 19177990

(51) Int. Cl.
*B32B 7/12* (2006.01)
*B32B 3/06* (2006.01)
*B32B 3/12* (2006.01)
*B32B 9/00* (2006.01)
*B32B 33/00* (2006.01)

(52) U.S. Cl.
CPC ................ *B32B 9/002* (2013.01); *B32B 3/06* (2013.01); *B32B 3/12* (2013.01); *B32B 7/12* (2013.01); *B32B 33/00* (2013.01); *B32B 2260/028* (2013.01); *B32B 2260/046* (2013.01); *B32B 2305/024* (2013.01); *B32B 2305/08* (2013.01); *B32B 2307/558* (2013.01); *B32B 2307/7376* (2023.05); *B32B 2315/10* (2013.01)

(58) Field of Classification Search
None
See application file for complete search history.

(56) References Cited

U.S. PATENT DOCUMENTS 3,880,972 A * 4/1975 Towne ..................... H01B 3/04
264/110
12,017,445 B2 * 6/2024 Benoit .................... B32B 9/005

* cited by examiner

*Primary Examiner* — Sheeba Ahmed
(74) *Attorney, Agent, or Firm* — Ferguson Case Orr Paterson LLP

(57) ABSTRACT

The present invention relates to a multilayer material comprising a layer of stone (1) laminated to a layer of reinforcing element (2) and its manufacturing process.

11 Claims, 5 Drawing Sheets

STONE SURFACE COVERING

CROSS-REFERENCE TO RELATED APPLICATIONS

This application claims priority to and benefit of European Patent Application No. 19177396.9, filed on May 29, 2019, European Patent Application No. 19177990.9 filed on Jun. 6, 2019, and International Application No. PCT/EP2020/064416, filed on May 25, 2020, and is a continuation-in-part of U.S. patent application Ser. No. 17/914,206 to Benoit.

SPECIFICATION

The present invention relates to a multilayer material comprising a layer of stone laminated to a layer of reinforcing element and its manufacturing process.

Stone is commonly used for bringing a and luxury touch when applied to buildings, transportation means or to the devices used in daily life such as decorative panels and floorings, interior for business jets and ships such as tables, flooring and panels, smartphones covers, power banks covers or even furniture. Unfortunately, using such a stone is very time-consuming and not user-friendly by manipulation of heavy stone tiles, use of cement for flooring applications or when stone is used in devices or transportations means. When stone must be moved or placed when used in buildings, it requires a lot of precaution and steps. To facilitate the manipulation of stone, reducing the thickness thereof is necessary, even more when it comes to daily life devices, but fragility of the stone increases due to its heavy weight and the thin thickness of the slab. A compromise between fragility and thickness must be found.

To that end, multilayer materials have been developed.

An example of multilayer material is known from document WO2009142365 A1. The document describes a plate product using stone laminated to a layer of reinforcing element for floor and wall finishing.

The disclosed multilayer material uses necessarily a first and a second layers of reinforcing material (a reinforcing layer and a backing layer), in addition to the layer of stone laminated to reinforcing layers. Said backing layer comes to strengthen the stone and increases the thickness of said multilayer material. Such a multilayer material comprises a reinforcing layer which is made of a sublayer of plastic between two sublayers of aluminum. The reinforcing layer is described as being not strong enough to support the stone by itself and therefore requires a backing layer. The backing layer is a layer made by a honeycomb structure. Such a multilayer material while reducing the thickness of the stone, must depend on multiple reinforcing materials and still presents preventing use in daily life devices.

Moreover, multilayer material described in document WO2009142365 A1 has limited applications because such a multilayer material is necessarily clipped to another one. Indeed the backing layer uses an interlocking system which limits the applications to floor and wall finishing.

There is a need of a simple multilayer material which can be used for multiple applications with different thicknesses.

The present invention encounters to solve the issues of the prior art by providing a multilayer material comprising a layer of stone laminated to a layer of reinforcing element wherein each layer comprises a first face and a second face opposite to the first face, and wherein said layer of reinforcing element comprises a mica plate or mica layer, the second face of said layer of stone and the first face of said layer of reinforcing element are laminated together at least by an adhesive layer, said stone having a thickness from 1 mm to 10 mm, more preferably from 2 mm to 6 mm.

Mica is commonly used as an insulator and more particularly as an electrical insulator at room and high temperature. Mica is a mineral with a laminated structure and known for its heat resistance. Its main known applications are electrical insulator in capacitors, electrical insulator in commutators segments of motors and generators, insulators in toasters and to support electrified heating elements, protection for microwaves emitters in microwave ovens, tapes to insulate copper bars in high voltage motors, alternators and generators and fire-resistant tapes to insulate electrical cables in case of fire.

Surprisingly using mica plate or mica layer as a reinforcing element improves the mechanical resistance of the stone layer while presenting fire resistances features. Impact resistance of the multilayer material according to the present invention is very high when compared to other reinforcing elements. Surprisingly, for a same impact resistance, the layer of the mica plate or mica layer is four times less thick than the layer of a common reinforcing element, for example, honeycomb structure panel, for the same impact resistance. Further, the material according to the present invention shows wave permeability characteristics, a light weight, a low thickness, outstanding fire performances and low thermal expansion unlike the conventional reinforcing and backing layers which limit the applications by their performances, either because of their fragility, high weight, low temperature resistance, waves barrier or high thickness.

For many applications, the thickness of the multilayer material will be a key factor for reaching consumer acceptance. For some daily life devices, the thickness should be very low, in the order of magnitude of 2 to 3 mm, while in other applications like flooring or wall applications, the final thickness should reach standard values of 8 mm to 40 mm, preferably from 8 mm to 18 mm. The use of thinner stone associated to conventional backing materials limits their functionalities and impact resistance that the use of such multilayer material would requires.

The thickness of stone layer is preferably between 1 to 20 mm, preferably 1 to 10 mm, more preferably between 2 mm to 6 mm. The thickness of the stone layer keeps enough thickness to protect the multilayer material from breaking easily and to ensure polyvalence of the multilayer material depending on the contemplated applications.

The mica plate or mica layer will have a thickness from 0.5 mm to 20 mm, preferably from 0.75 mm to 10 mm and more preferably from 1 mm to 3 mm.

Advantageously, said multilayer material according to the present invention presents an impact resistance at least 5 times higher than the stone alone for the same thickness.

More advantageously, the mica plate or mica layer according the present invention comprises from 70% to 95% (w mica:w mica+binder) of mica (flakes), said mica (flakes) being muscovite, phlogopite, synthetic mica types, or combination thereof, and from 5% to 30% (w binder:w mica+binder) of a binder, more preferably 90% of mica (flakes) and 10% of a binder (w:w).

Preferably, said adhesive layer of said multilayer material according to the present invention is a layer of adhesive chosen in the group of epoxy-based adhesive, silicone-based adhesive, polyurethane, cyanoacrylate, polyvinyl acetate, hot melt or polymeric glue. The glue will be applied by roll coater, by spraying, by brushes, by rollers or extruded method. The thickness of the adhesive layer is between 0.10 mm and 0.25 mm.

More preferably, the binder used in the mica plate or mica layer composition according the present invention is an epoxy-binder, a polyester-binder, a borosilicate or silicone-binder or a combination thereof.

Preferably, the mica layer or the mica plate is a superposition of thinner mica sheets or mica papers impregnated with a binder. Advantageously, from 7 to 35 mica sheets or mica papers are stacked to form 1 mm thick mica plate, preferably from 14 to 16 mica sheets or mica papers are stacked to form 1 mm thick mica plate.

Possibly, such a multilayer material according the present invention is characterised in that it is further comprising a backing layer having a first face and a second face, the first face of said backing layer facing the second face of the layer of reinforcing element, and being preferably laminated to the second face of said layer of reinforcing element.

Preferably, such a multilayer material according to the present invention is characterised in that the thickness of said backing layer is from 2 mm to 15 mm.

According to a preferred embodiment of the present invention, the backing layer is a layer comprising High Density Fibreboard, Medium Density Fibreboard, fibre cement, wood, mineral fibres or combination thereof.

Alternatively, the multilayer material according to the present invention does not comprise a backing layer, preferably the multilayer material according to the present invention does not comprise a backing layer of honeycomb structure, a backing layer being an aluminium honeycomb panel, or (a honeycomb structure) made of fibreboard or wood or paper.

Advantageously, the multilayer material according to the present invention further comprises an additional layer laminated on the mica layer at the opposite surface from the stone layer, being a sound insulating layer, a magnetic layer, a light-comprising layer (such as a layer with embedded LEDs or other light-emitting sources) and/or a hook-and-loop fastener.

According to another preferred embodiment of the present invention, such a multilayer material according to the present invention is shaped in standardised covering element with at least one coupling means, said coupling mean being provided engaging mutual coupling means for connecting with another covering element.

Advantageously, said coupling means according to the present invention are chosen amongst notches, a U-shape interlocking element, a straight-shape interlocking element, a male interlocking element, a female interlocking element. Said notches have preferably a length comprised between 5 mm and 16 mm and a width comprised between 2 mm and 6 mm. The system of notches can be used without the backing layer. The interlocking element can be in a U shape or straight shape or any other convenient shape. Using an interlocking system enable the assemblage of multiple multilayer materials leading to the constitution of a multilayer materials floor or wall surface.

More advantageously, stone of said layer of stone is at least a stone chosen amongst the group of marble, ceramic, travertine, blue stone, limestone, basalt, onyx, sandstone, granite, quartzite, slate, agglomerated stones, composite stones or combination thereof. Preferably the stone has a narrow tolerance in thickness with a tolerance of ±0.1 mm.

Even more advantageously, the first face of said layer of stone according to the present invention may be coated with a protective coating. The coating is preferably transparent and curable at room or high temperature or U.V. to protect the multilayer material against the aggression from vapor, water, staining agents, aggressive chemicals, abrasion or scratches.

Other embodiments according to the present invention are mentioned in the appended claims.

The present invention also relates to a process comprising the steps of a. Providing a stone element having a first face and a second face, opposite to said first face
b. Providing a reinforcing element under the form of a mica plate or mica layer having a first face and a second face, opposite to said first face
c. Gluing said first face of the reinforcing element to the second face of the stone element
d. Adjusting the thickness of the stone element or the surface uniformity.

Preferably, said stone of said layer of stone is at least a stone chosen amongst the group of marble, ceramic, travertine, blue stone, limestone, basalt, onyx, sandstone, granite, quartzite, slate, agglomerated stones, composite stones or combination thereof.

Advantageously, the present invention further comprises an additional reinforcing element having a first face and a second face, opposite to said second face of the reinforcing element on the first face of the stone element, optionally simultaneously with step c) and further comprising before step d) a sawing step of said stone element in two slices of stone element to form a first and a second layer of stone.

Usually, the stone is recovered, cut and shaped in blocks. Later on, and depending on the applications needed, the stone will be cut in different slabs. When the stone is cut, it is realised by a sawing process. During this sawing process, the temperature increases and can become very high. Thus, a wet sawing process is advised and can last many hours.

The stone has a high density and heavy, and therefore its fragility increases with the thin thickness of the layer. The stone must be sawed to become a very thin layer of stone without breaking. Thus, lots of precautions must be taken while sawing the stone but also when the stone is placed. Indeed, if an object falls or is projected on the stone, it should not be broken easily.

To solve these issues, there is a need of reinforcing the stone before the sawing process, said sawing process being a step of the process of manufacturing a multilayer material.

A multilayer material based on stone is generally difficult to be manufactured. Due to the fragility of the stone material, it must be laminated to a reinforcing element or backing layer as explained before for sawing. Usual reinforcing or baking elements are aluminum honeycomb, PVC panel, aluminum-PVC-aluminum panel, ceramic tile or glass fibres reinforced with epoxy resin.

First of all, even if several documents refer to some backing materials as HDF standard or HDF reinforced with mineral fibres, the technical feasibility is largely compromised since these materials cannot withstand the many hours of water contact that this wet sawing step requires or are not appropriate. Consequently, when this type of reinforcing or baking material is used, it is glued after the sawing process.

Moreover, preferably in the flooring and wall finishing applications, it is very important to have walls a building which does not limit the work of people in there. We live in a high connected society and we are very dependent on Wi-Fi and phone connectivity for our work which is often international. Therefore, reinforcing or backing elements as aluminium-PVC-aluminium panels and aluminium honeycomb panels are not efficient when laminated to the stone.

They are not or few permeable to the waves and lead to a very hard time when a teleconference or an international call is performed for example.

In addition to this, the building security is one of the most important aspects to think about and security means also resistance to fire by walls and floors and no smoke toxicity. The materials used in the composition must have an efficiency to resist at very high temperatures. For example, such reinforcing elements as PVC panels or aluminium honeycomb panels or glass fibres reinforced with epoxy resin will not withstand long lasting fire performance as required by some fire-resistant regulations.

Also, the reinforcing materials must have a high impact resistance to ensure that the stone will not break due to its fragility as a thin layer. Reinforcing elements as ceramic materials or glass fibres reinforced with epoxy resin are characterised by a low impact resistance and therefore cannot be used.

Unfortunately, this kind of reinforcing or backing layers are difficult to use in an industrial process.

To solve those issues, the manufacturing process according to what has been mentioned before is characterized in that the reinforcing element is a mica plate or mica layer.

The mica plate or mica layer is, as described before, commonly used as an electrical insulator. Surprisingly, the mica plate or mica layer presents all the characteristics necessary to be a good reinforcing material which can be laminated either directly to the stone layer after the sawing process or either which can be laminated to the layer before the sawing process and therefore adaptable to all applications.

When the sawing step is performed according to an embodiment of the present invention, said mica plate or mica layer will resist to an exposure to water for many hours and will not be damaged to this exposure.

Moreover its impact resistance enables the sawing of the stone layer without breaking it whatever a large piece of stone is needed or small one, independently from the type of saw. The multilayer material according to the present invention enable a sharp edge cutting.

Mica plate or mica layer improves the mechanical resistance of the stone layer while presenting fire resistance features and low thermal expansion features. Impact resistance of the multilayer material according to the present invention is very high when compared to other reinforcing elements.

Further, the multilayer material manufactured according to the present invention shows high wave permeability characteristics and a light weight for a high impact resistance.

Preferably, the stone is sliced in the thin-slab and then grinded and optionally polished on the first face of the stone layer to render a narrow tolerance in thickness, preferably with a tolerance of ±0.1 mm. The edge can be grinded to create a bevel of 1 mm to 2 mm or rounded on the side for an aesthetic effect.

Grinded means that the stone has been sanded with very abrasive discs to reduce the thickness of the stone.

Advantageously, the manufacturing process according to the present invention comprises an additional step of gluing a backing layer to the obtained multilayer material, towards the reinforcing element.

Use of other backing materials does not allow either the realisation of solid and stable notches convenient to insert an interlocking element that will join at least two pieces of multilayer material according to the invention.

Moreover, in case a protective coating is applied to the layer of stone and requires to be cured at high temperature, the temperature resistance of the reinforcing element such as HDF or PVC will prevent to process the curing at 200° C. for a few seconds to several minutes as required for many protective coatings. The PVC shows some distortion from exposure at 60° C. thus limiting the curing temperature and time of exposure.

More specifically when the multilayer material is used in wall and floor finishing application or a free-floating flooring application, use of reinforcing element as aluminum is not efficient as it acts like a barrier against wave and attenuates the signal for waves such as Wi-Fi or radio waves. Moreover, in case of fire, the aluminum will also melt when reaching a temperature of 660° C., destroying the honeycomb structure with a risk of falling when attached on the walls. PVC will start melting at a temperature of about 120° C. and a halogenic smoke to be known to be toxic will escape under fire.

Other embodiments according to the present invention are mentioned in the appended claims.

Other characteristics and advantages of the present invention will be derived from the non-limitative following description, and by making reference to the drawings and the examples.

In the drawings, FIG. 1 is a cross-sectional view of a multilayer material according to the present invention.

In the drawings, the same reference numbers have been allocated to the same or analog element.

Figure 1:
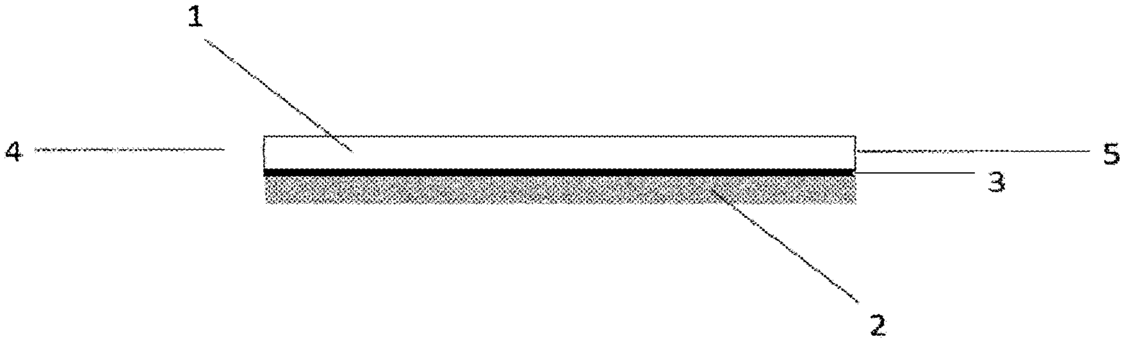
Figure 2:
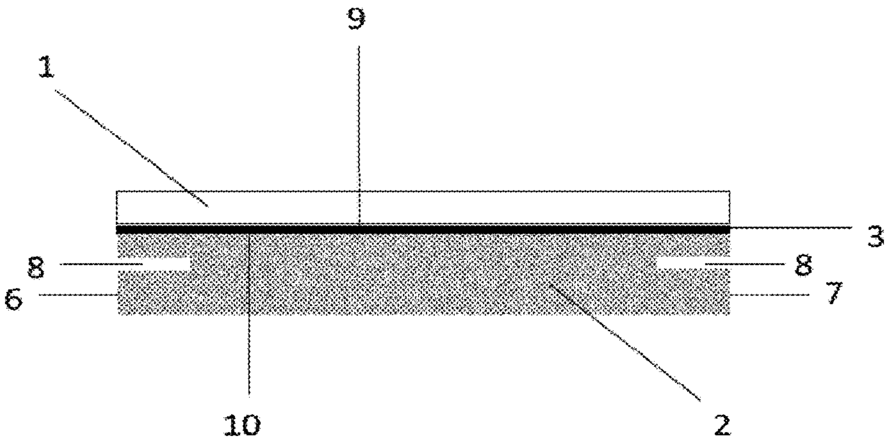
FIG. 2 is a cross-sectional view of a second embodiment of a multilayer material according to the present invention.

A multilayer material is manufactured comprising a thin layer of stone 1 laminated to a thin layer of mica plate 2 with straight third face 4 and straight forth face 5, the second face of said thin layer of stone 1 and the first face of said thin layer of mica plate 2 are laminated together by an adhesive layer 3.

Preferably, a multilayer material is manufactured according to the present invention comprising a thin layer of stone 1 laminated to a mica plate 2 with a third face 6 and a fourth face 7 comprising two notches 8, the second face 9 of said thin layer of stone 1 and the first face 10 of said mica plate 2 are laminated together by an adhesive layer 3.

Preferably, a multilayer material is manufactured according to the present invention comprising a thin layer of stone 1 laminated to a mica layer 2 with the second face 11 comprising two notches 8, the second face 9 of said thin layer of stone 1 and the first face 10 of said mica layer 2 are laminated together by an adhesive layer 3.

More preferably, a multilayer material is manufactured according to the present invention comprising a thin layer of stone 1 laminated to a mica layer 2, the second face 9 of said thin layer of stone 1 and the first face 10 of said mica layer 2 are laminated together by an adhesive layer 3. Said backing layer 12 is laminated to the second face 11 of said mica layer 2 by an additional adhesive layer 3 and said backing layer 12 comprises an male-female interlocking system 13.

Advantageously a multilayer material is manufactured according to the present invention comprising a thin layer of stone 1 laminated to a mica plate 2 with the third 6 of forth face 7 comprising two notches 8, the second face 9 of said thin layer of stone 1 and the first face 10 of said mica plate 2 are laminated together by an adhesive layer 3. Said backing layer 12 is laminated to the second face 11 of said mica plate 2 by an additional adhesive layer 3.

In a preferred embodiment, a multilayer material is manufactured according to the present invention comprising a thin layer of stone 1 laminated to a mica plate 2, the second face 9 of said thin layer of stone 1 and the first face 10 of said mica plate 2 are laminated together by an adhesive layer 3. Said backing layer 12 is laminated to the second face 11 of said mica plate 2 by an additional adhesive layer 3 and said backing layer 12 comprises two notches 8 on its second face 15.

In another preferred embodiment, a multilayer material is manufactured according to the present invention comprising a protective coating 14, a thin layer of stone 1 laminated to a layer of mica layer 2 comprising one notch 8 on its third face 6 and one notch 8 on its forth face 7, the second face 9 of said thin layer of stone 1 and the first face 10 of said mica layer 2 are laminated together by an adhesive layer 3. Said backing layer 12 is laminated to the second face 11 of said mica layer 2 by an additional adhesive layer 3.

In an advantageous embodiment, a multilayer material is manufactured according to the present invention and is associated with another multilayer material manufactured according to the present invention too wherein both multilayer materials comprise a thin layer of stone 1 laminated to a mica layer 2, the second face 9 of said thin layer of stone 1 and the first face 10 of said mica layer 2 are laminated together by an adhesive layer 3. Said backing layer 12 is laminated to the second face 11 of said mica layer 2 by an additional adhesive layer 3, said backing layer 12 comprises a male-female interlocking system 13 to combine the two multilayer materials.

In another embodiment, a multilayer material is manufactured according to the present invention and is associated with another multilayer material manufactured according to the present invention too wherein both multilayer materials comprise a thin layer of stone 1 laminated to a mica plate 2 comprising one notch 8 on its third face 6 and one notch 8 on its forth face 7, the second face 9 of said thin layer of stone 1 and the first face 10 of said mica plate 2 are laminated together by an adhesive layer 3. Said backing layer 12 is laminated to the second face 11 of said mica plate 2 by an additional adhesive layer 3. An interlocking element in straight shape 16 is used to combine the two multilayer materials by connecting one notch 8 of the layer of mica plate 2 a first multilayer material to one notch 8 of the mica plate 2 of a second multilayer material.

In another embodiment, a multilayer material is manufactured according to the present invention and is associated with another multilayer material manufactured according to the present invention too wherein both multilayer materials comprise a thin layer of stone 1 laminated to a layer of mica plate 2, the second face 9 of said thin layer of stone 1 and the first face 10 of said mica plate 2 are laminated together by an adhesive layer 3. Said backing layer 12 is laminated to the second face 11 of said mica plate 2 by an additional adhesive layer 3, said backing layer 12 comprises two notches 8 on its second face 15. An interlocking element in U shape 17 is used to combine the two multilayer materials by connecting one notch 8 of the backing layer 12 of a first multilayer material to one notch 8 of the backing layer 12 of a second multilayer material.

EXAMPLES

The present invention is about a multilayer material but also a manufacturing process of the multilayer material.

Example 1

We produced a multilayer material as described in FIG. 1 to obtain a piece of 100 cm×115 cm large by 8.25 mm thick and composed of a grey marble stone 6 mm thick 1, a layer of bi-component epoxy glue of 0.25 mm 3 and a muscovite mica layer of 2 mm thick 2. We first glued a piece of marble stone of 18 mm thick 1 and 100 cm×120 cm large on its both larger faces to two separated pieces of mica layer 2 100 cm×120 cm large by 2 mm thick, each composed of 10% epoxy binder and mica (flakes) of the muscovite type. We then pressed the glue at 400 N/m$^2$ and we cured it at room temperature for 6 hours. We used a glue being of the type of bi-component glue with a viscosity of 10 000 cps to 14 000 cps at 95% solid content. We then sawed the multilayer material by cutting the marble stone from its edge with a diamond stone saw at a speed of 0.5 m/min to render 2 pieces of marble-mica layer multilayer materials 1 of 100 cm×120 cm. We then grinded the stone layer 1 and polished it to render a smooth and adjusted surface thickness for each multilayer material.

Example 2

Figure 3:
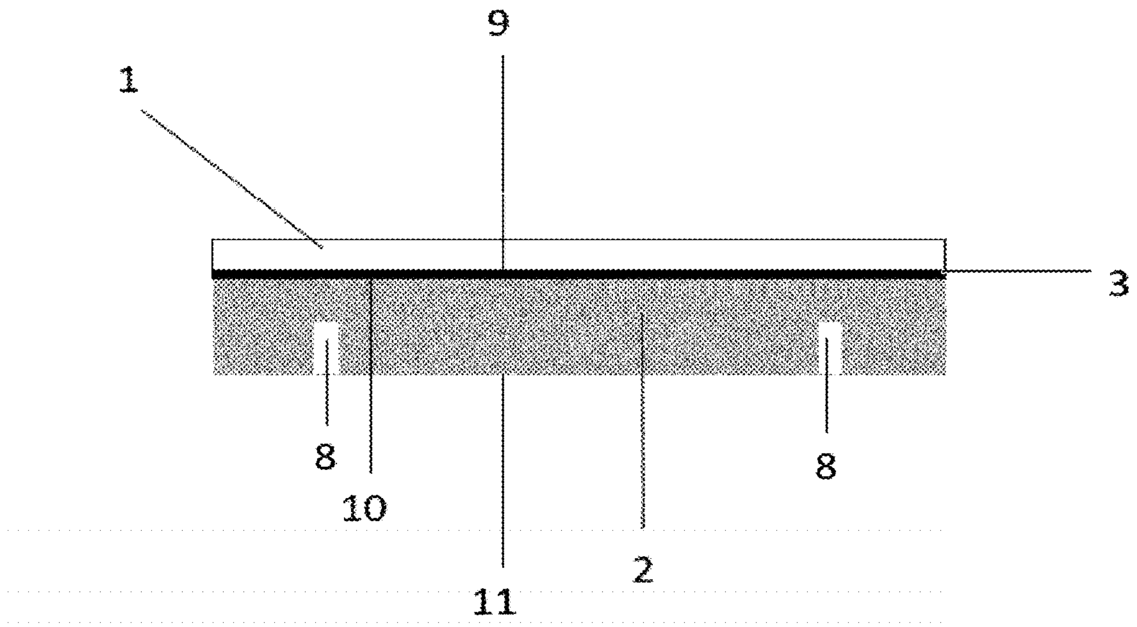
FIG. 3 is a cross-sectional view of a third embodiment of a multilayer material according to the present invention.

We produced a multilayer material as described in FIG. 3 to obtain a piece of 20 cm×115 cm of 16.15 mm thickness composed of a grey marble stone 6 mm thick 1, a layer of bi-component epoxy glue of 0.15 mm 3 and a muscovite mica layer of 10 mm thick 2. We glued a piece of 18 mm thick marble stone 100 cm×120 cm 1 large on its both larger surfaces to two pieces of mica layer of 10 mm thick 2 composed of 12% epoxy binder and muscovite mica (flakes). We then pressed the glue at 400 N/m$^2$ and cured it at 20° C. for 24 hours. We used a glue being of the type of bi-component glue with a viscosity of 10 000 cps to 14 000 cps at 95% solid content. We then sawed the multilayer material by cutting the marble stone 1 from its edge with a diamond stone saw at a speed of 1 m/hour to render two pieces of marble-mica layer multilayer materials of 100 cm×120 cm. We grinded and polished the stone layer 1 to render a smooth and adjusted surface thickness. We then cut the multilayer material obtained in pieces of 20 cm×115 cm with a stone saw. We polished sharp edges of stone marble 1 to render a bevel of 1 mm on each edge. We made two parallel notches 8 mm deep and 3 mm wide 8 and at a distance of 5 cm from the longer edges on the second face of the mica layer 2 by the mean of diamond saw to allow the fixation of interlocking element in U-shape 16 to another piece of the same multilayer material.

Figure 4:
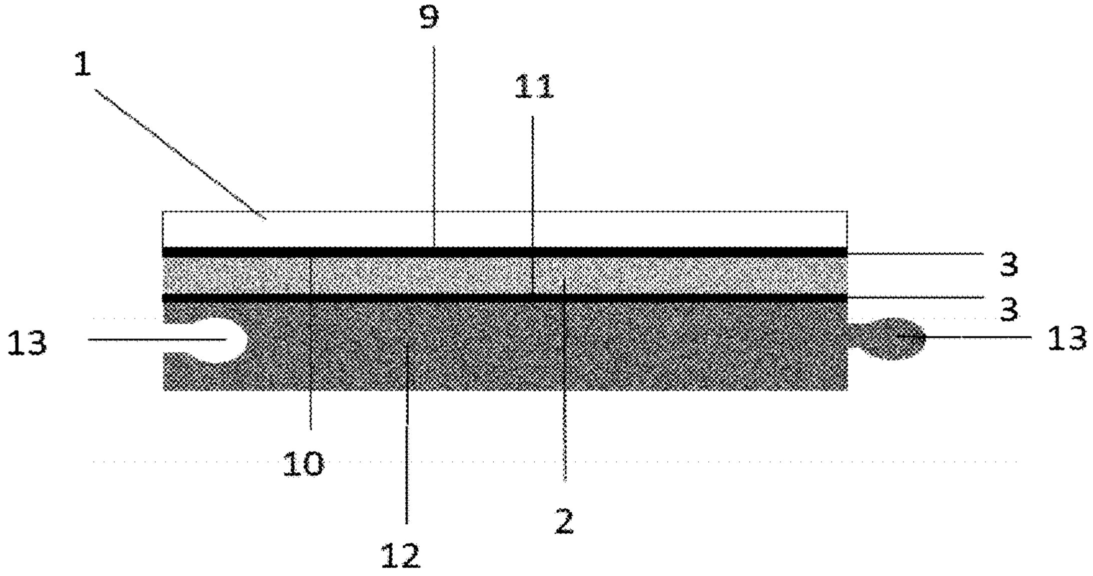
FIG. 4 is a cross-sectional view of a preferred embodiment of a multilayer material according to the present invention.
Figure 5:
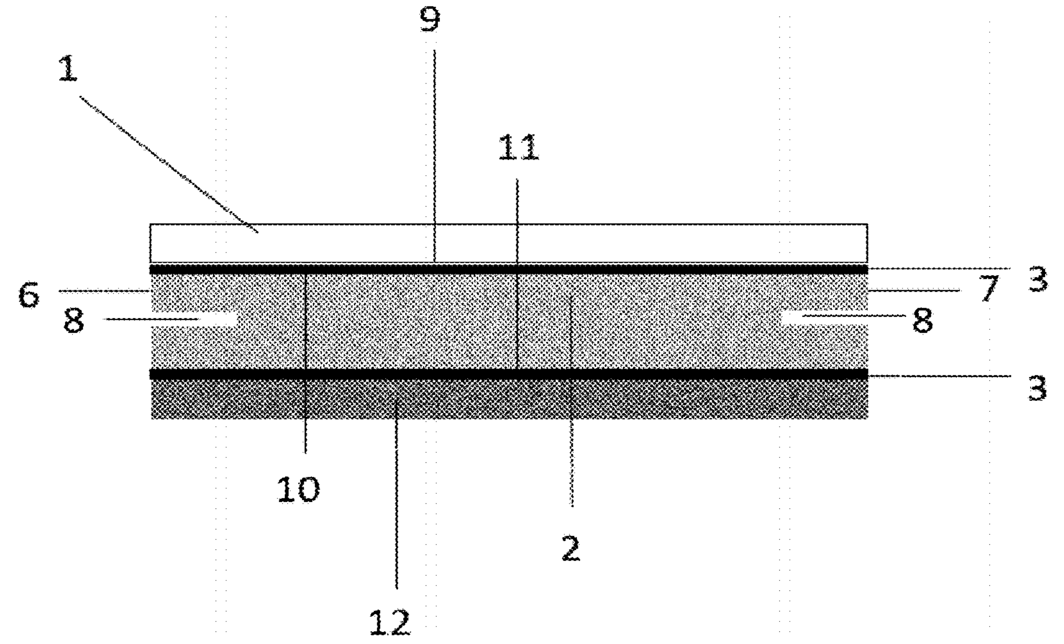
FIG. 5 is a cross-sectional view of a preferred embodiment of a multilayer material according to the present invention.
Figure 6:
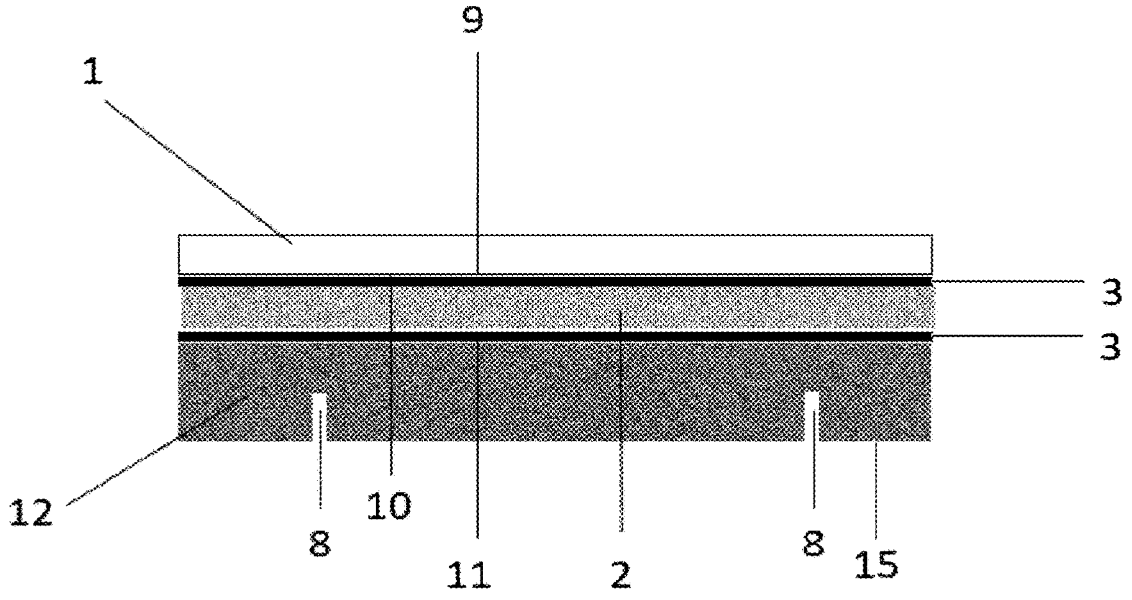
FIG. 6 is a cross-sectional view of a preferred embodiment of a multilayer material according to the present invention.
Figure 7:
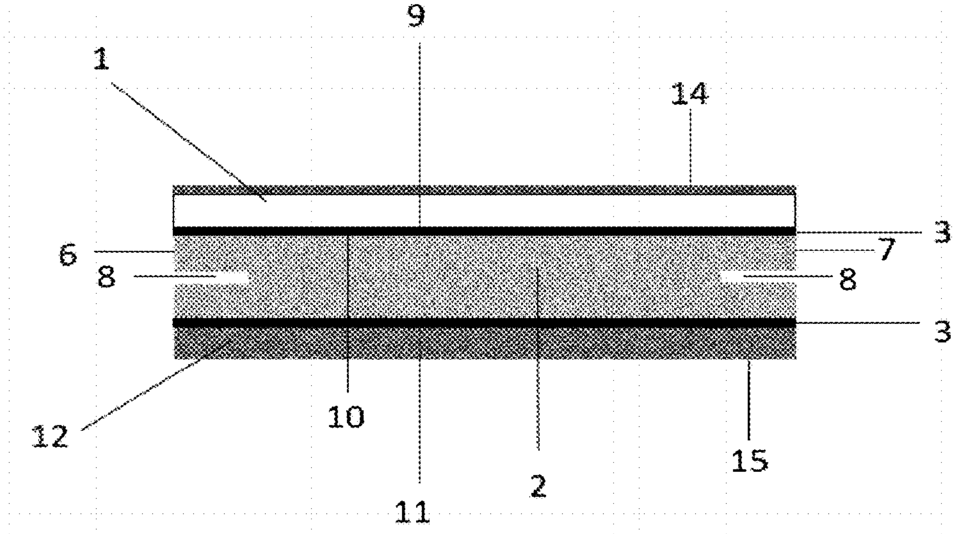
FIG. 7 is a cross-sectional view of another preferred embodiment of a multilayer material according to the present invention.
Figure 8:
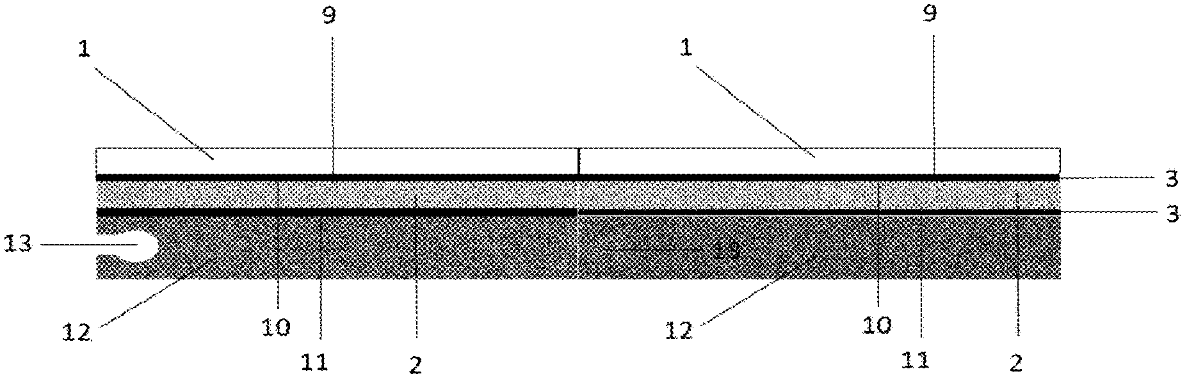
FIG. 8 is a cross-sectional view of an association of 2 multilayer materials according to the present invention.
Figure 9:
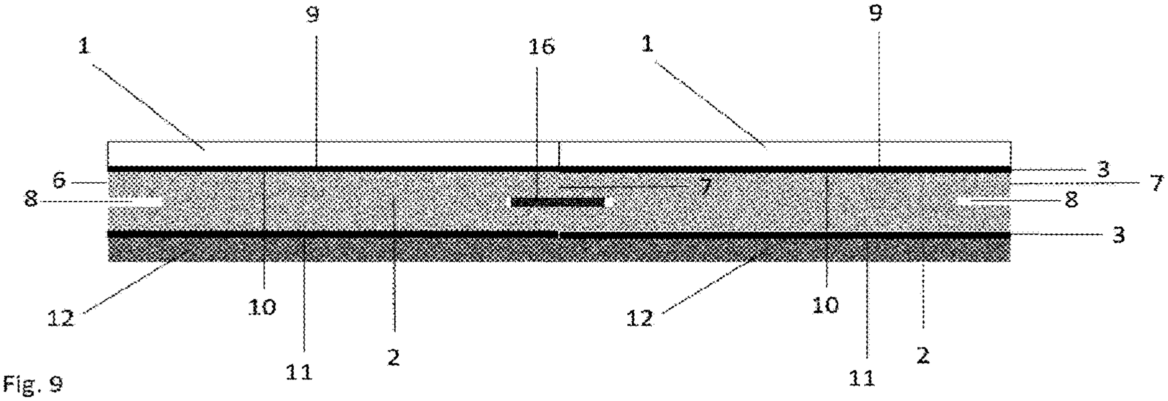
FIG. 9 is a cross-sectional view of another embodiment of an association of 2 multilayer materials according to the present invention.
Figure 10:
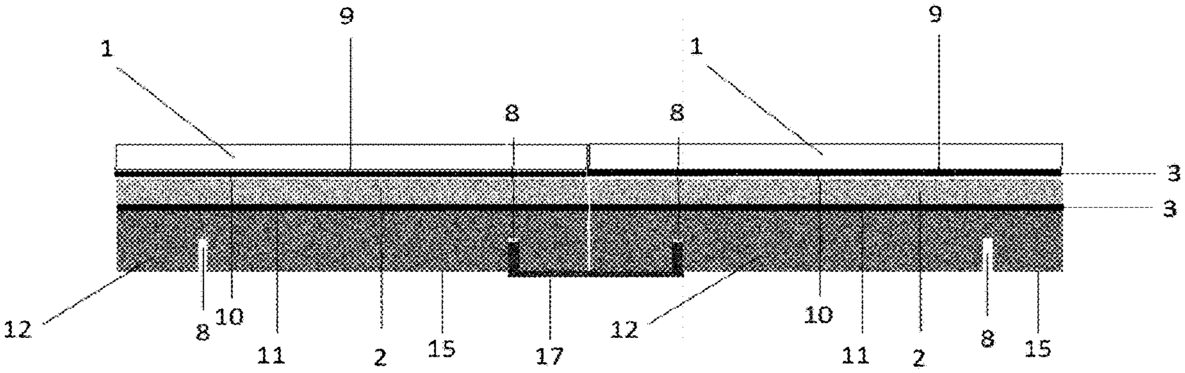
FIG. 10 is a cross-sectional view of a preferred embodiment of an association of 2 multilayer materials according to the present invention.

We produced a multilayer material as shown in FIG. 4 by a similar process as in Example 1 to obtain a piece of a multilayer material stone-mica of 100 cm×115 cm. We then sawed the piece in five pieces of 20 cm×1.15 cm and we glued it to an HDF backing layer 12 with male-female interlocking elements 13 by applying a thickness of 0.25 mm of a polymeric glue 3 and cured under a pressure of 50 $N/m^2$ for 24 hours.

Example 3

We have processed impact tests on several samples to evaluate the resistance to rupture of some embodiments of the invention to compare performance versus samples of stone thicknesses and samples of stone-honeycomb aluminum and stone-PVC multilayer material structures commonly available on the market.

We evaluated the resistance to rupture of samples by dropping a spherical steel ball from increasing height by steps on the stone surface of samples to observe if a rupture occurred in the stone tile layer. We performed the testing method following the conditions described in the norm EN 14617-9:2005 (shock resistance of flat products made of agglomerated stones) except for 2 adaptations to increase relevancy of test results to the materials of the invention. These 2 adaptations to EN 14617-9:2005 testing method are:

1. The test method described in the EN 14617-9:2005 considers impacting the centre of a sample several times exactly at the same point while increasing by step of 5 cm the height of the steel ball to measure the maximum height at rupture. We voluntary adapted the achieved testing method to avoid having the influence of the preceding shock on the stone so that we replaced the sample by a new sample each time the ball dropped on the stone surface of the sample, while following all the other tests conditions of the EN 14617-9:2005.
2. The test method described in the EN 14617-9:2005 considers a maximum height of the impacting steel ball of 1.20 m. We considered in the achieved method a height till rupture, whatever if this exceeds 1.20 m or not.

In order to proceed the impact tests, we used 4 pieces of the size 20×20 cm each having the stone component made of polished grey marble of Serbian origin commonly named as Plavi tok grey marble as testing samples. The tested samples were composed of:

Samples 1: Marble 16 mm thick. Energy at rupture has been measured by fall of 1 kg steel ball from 21 cm height.

Samples 2: Marble 6 mm thick laminated to a muscovite mica layer 10 mm thick with 10% epoxy binder by a bi-component epoxy glue 0.20 mm thick. Energy at rupture has been measured by fall of 1 kg steel ball from 131 cm height.

Samples 3: Marble 6 mm thick laminated to a muscovite mica layer 2 mm thick with 10% epoxy binder by a bi-component epoxy glue 0.20 mm thick. Energy at rupture has been measured by fall of 1 kg steel ball from 51 cm height.

Samples 4: Marble 6 mm thick laminated to PVC 3 mm thick by a bi-component epoxy glue 0.20 mm thick. Energy at rupture has been measured by fall of 1 kg steel ball from 61 cm height.

Samples 5: Marble 6 mm thick laminated to honeycomb aluminum panel 10 mm thick with hexagonal cells diameter of ⅜ with a thickness aluminum foil of 50 to 70 μm with 2 skins of bidirectional glass fibre fabric of 490 $g/m^2$ glued with a thermoplastic adhesive by a bi-component epoxy glue 0.20 mm. Energy at rupture has been measured by fall of 1 kg steel ball from 51 cm height.

TABLE 1

Energy at rupture of stone tiles versus some embodiments of the invention (joules)

| | Energy at rupture (J) | Energy at rupture (J) | Energy at rupture (J) | Energy at rupture (J) | Energy at rupture (J) average |
|---|---|---|---|---|---|
| samples 1 | 2.06 | 2.55 | 2.55 | 2.55 | 2.43 |
| samples 2 | 14.81 | 13.83 | 13.34 | 13.34 | 13.83 |
| samples 3 | 8.43 | 7.45 | 5.49 | 7.45 | 7.21 |
| samples 4 | 6.47 | 5.00 | 5.00 | 5.98 | 5.61 |
| samples 5 | 8.43 | 5.49 | 7.94 | 6.96 | 7.21 |

We can observe from the table 1 that samples 2, a preferred embodiment according to the present invention shows an average energy at rupture superior by at least 5 times the average energy at rupture than samples 1, a stone alone. This performance is of benefit for applications such as floor surface covering for example.

We can also observe from the table 1 that samples 3, another embodiment according to the present shows an average energy at rupture a bit less than 3 times higher than energy at rupture of samples 1, a stone alone.

We can also observe from the table 1 that samples 2 and 3 which represent two different embodiments of the invention, shows an average energy at rupture higher than energy at rupture of samples 4 and 5 which represent common embodiments already known and used.

Moreover, a preferred embodiment according to the present invention shows a decrease the thickness of the reinforcing element layer by 4 times when we compare samples 3 and samples 5.

Remark: samples 5 are not showing any crack in the stone like the other samples but the samples are damaged and useless even if the reinforcing element of samples 5 prevented the progression of a crack in the stone.

It should be understood that the present invention is not limited to the described embodiments and that variations can be applied without going outside of the scope of the appended claims

The invention claimed is:

1. A multilayer material comprising a layer of stone laminated to a layer of reinforcing element wherein each layer comprises a first face and a second face opposite to the first face, and wherein said layer of reinforcing element comprises a mica plate or mica layer, the second face of said layer of stone and the first face of said layer of reinforcing element are laminated together at least by an adhesive layer, said stone having a thickness of at least 1 mm said mica plate or mica layer comprising between 70 wt % and 95 wt % of mica flakes and between 5 wt % and 30 wt % of a binder, said multilayer material not comprising a backing layer made of honeycomb structure.

2. The multilayer material according to claim 1 characterized in that said multilayer material presents an impact resistance at least 5 times higher than the stone alone for the same thickness.

3. The multilayer material according to claim 1, wherein said mica flakes are selected from muscovite, phlogopite, synthetic mica types, or a combination thereof.

4. The multilayer material according to claim 1, wherein said adhesive layer is a layer of adhesive chosen from the group of epoxy-based adhesive, silicone-based adhesive, polyurethane, cyanoacrylate, polyvinyl acetate, hot melt or polymeric glue.

5. The multilayer material according to claim 1, wherein said binder is an epoxy-binder, a polyester-binder, a borosilicate or silicone-binder or a combination thereof.

6. The multilayer material according to claim 1 further comprising an additional layer laminated to the face of the reinforcing element opposite to the layer of stone, said additional layer being a sound-insulating layer, a magnetic layer, a light-comprising layer and/or a hook-and-loop fastener.

7. The multilayer material according to claim 1, wherein the mica plate or mica layer consists of a superposition of mica papers or of mica sheets impregnated with the binder.

8. The multilayer material according to claim 1 shaped to be a standardised covering element provided with at least one coupling means, said coupling means being provided engaging mutual coupling means for connecting with another covering.

9. The multilayer material according to claim 8, wherein said coupling means are chosen amongst notches, a U-shape interlocking element, a straight-shape interlocking element, a male interlocking element, or a female interlocking element.

10. The multilayer material according to claim 1, wherein said stone of said layer of stone is at least a stone chosen from the group of marble, ceramic, travertine, blue stone, limestone, basalt, onyx, sandstone, granite, quartzite, slate, agglomerated stones, composite stones or a combination thereof.

11. The multilayer material according to claim 1, wherein the first face of said layer of stone is coated with a protective coating.

* * * * *